(12) United States Patent
Okada

(10) Patent No.: US 6,977,683 B1
(45) Date of Patent: Dec. 20, 2005

(54) DIGITAL CAMERA

(75) Inventor: Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/205,094

(22) Filed: Dec. 3, 1998

(30) Foreign Application Priority Data

Dec. 3, 1997 (JP) .................................. 9-332813

(51) Int. Cl.[7] .......................... H04N 9/83; H04N 3/14; H04N 5/222; G06K 9/32
(52) U.S. Cl. .................. 348/273; 348/333.11; 382/300
(58) Field of Search .................. 358/525; 348/333.05, 348/333.11, 333.12, 231.6, 272, 273, 280; 382/300

(56) References Cited

U.S. PATENT DOCUMENTS

| | | | | |
|---|---|---|---|---|
| 4,574,319 A | * | 3/1986 | Konishi | 348/231.6 |
| 5,040,068 A | * | 8/1991 | Parulski et al. | 348/376 |
| 5,053,861 A | * | 10/1991 | Tsai et al. | 348/231.6 |
| 5,477,264 A | * | 12/1995 | Sarbadhikari et al. | 348/231.6 |
| 5,734,779 A | * | 3/1998 | Okino | 386/38 |
| 5,901,242 A | * | 5/1999 | Crane et al. | 382/166 |
| 6,091,851 A | * | 7/2000 | Acharya | 382/167 |
| 6,130,960 A | * | 10/2000 | Acharya | 382/167 |
| 6,181,376 B1 | * | 1/2001 | Rashkovskiy et al. | 348/273 |
| 6,249,311 B1 | * | 6/2001 | Rouse et al. | 348/164 |
| 6,288,743 B1 | * | 9/2001 | Lathrop | 348/231.9 |
| 6,292,218 B1 | * | 9/2001 | Parulski et al. | 348/220.1 |
| 6,295,087 B1 | * | 9/2001 | Nohda | 348/234 |
| 6,313,868 B1 | * | 11/2001 | D'Alfonso et al. | 348/72 |
| 6,366,318 B1 | * | 4/2002 | Smith et al. | 348/272 |
| 2001/0017658 A1 | * | 8/2001 | Kuroiwa | 348/273 |
| 2001/0020979 A1 | * | 9/2001 | Lathrop | 348/222 |
| 2003/0058354 A1 | * | 3/2003 | Parulski et al. | 348/231.6 |

FOREIGN PATENT DOCUMENTS

| | | | | |
|---|---|---|---|---|
| JP | 4-8993 | 2/1992 | | |
| JP | 09168157 A | * | 6/1997 | ............ H04N 9/07 |

OTHER PUBLICATIONS

Adams et al.; "Color Processing in Digital Cameras"; 1998 IEEE; pp. 20-30.*

* cited by examiner

Primary Examiner—Thai Tran
Assistant Examiner—John M. Villecco
(74) Attorney, Agent, or Firm—Buchanan Ingersoll PC

(57) ABSTRACT

A digital camera employs an image sensor with color filters that correspond to individual pixels of the sensor. Image data detected by the sensor is recorded, together with data regarding the alignment of the color filters. The image data and the recorded alignment data are transmitted to a device external to the camera, where the image data is interpolated to produce complete color data for each pixel of the image. The complete color data is used to display the image. By means of this technique, the camera only needs to store and transmit the original image data, rather than interpolated complete image data. In addition, various interpolation processes can be employed in the external device, according to the particular desires of the user.

18 Claims, 12 Drawing Sheets

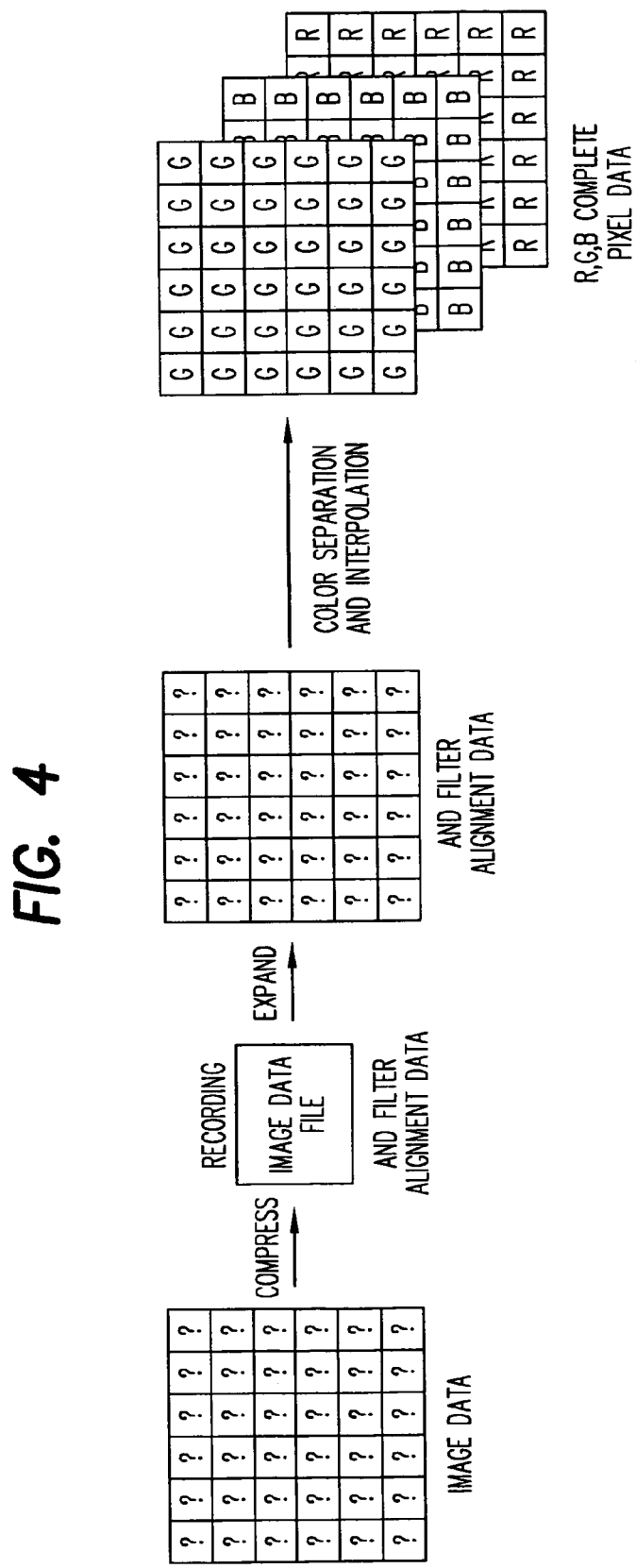

FIG. 5a

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

TYPE – 1

FIG. 5b

| B | G | B | G | B | G |
|---|---|---|---|---|---|
| G | R | G | R | G | R |
| B | G | B | G | B | G |
| G | R | G | R | G | R |
| B | G | B | G | B | G |
| G | R | G | R | G | R |

TYPE – 2

FIG. 5c

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

TYPE – 3

FIG. 5d

| G | B | G | B | G | B |
|---|---|---|---|---|---|
| R | G | R | G | R | G |
| G | B | G | B | G | B |
| R | G | R | G | R | G |
| G | B | G | B | G | B |
| R | G | R | G | R | G |

TYPE – 4

FILTER ALIGNMENT DATA

X = 3
Y = 3
0, 1, 2, 2, 0, 1, 1, 2, 0

FILTER ALIGNMENT DATA

COMPLETE PIXEL DATA → PIXEL DATA INCLUDING MISSING PIXELS → RE-INTERPOLATION

DIGITAL CAMERA

BACKGROUND OF THE INVENTION

1. Technical Field of the Invention

The present invention pertains to a digital camera that records images as electronic digital data.

2. Description of the Prior Art

In recent years, electronic still cameras (hereinafter 'digital cameras') that record images in a memory as digital data have started to become popular. In this type of digital camera, the image is normally formed on a CCD, which comprises the image pickup element, by means of an optical lens. The light energy is transferred into electrical signals by the CCD. The electrical signals are then converted into digital signals through analog/digital conversion (hereinafter 'A/D conversion') and stored in a memory. The digital data stored in the memory is displayed on a display unit incorporated in the camera or on a monitor connected to an external device such as a personal computer.

A CCD that is used as an image pickup element senses brightness information only, and therefore a digital camera normally has color filters for individual pixels of the CCD so that the image information is separated into R (red), G (green) and B (blue) color data by means of these color filters, and then sensed. To obtain data of the three different colors from the pixels that are aligned in a matrix, a method that uses three CCDs, each of which is coated with a single color of red, green or blue, respectively, and a method that uses a single CCD, the pixels of which are alternately coated with red, green or blue, are conventionally used. For generally marketed digital cameras, the second method is normally used. The description provided in this disclosure assumes a digital camera having a single CCD.

The signal processing sequence in a conventional digital camera, of the type described above, will be explained with reference to FIG. 11. In a digital camera 61, where an image is formed on the CCD, an R, G or B pixel signal is obtained for each pixel by means of the R, G and B filters which are located in one-to-one relationship with individual pixels (S61). In step S62, these pixel signals are converted through A/D conversion, and digital image data is created (S63). In order to create a color image, single digital image data comprising composite R, G and B pixel data is separated into individual sets of R, G and B pixel data, including missing pixels. In step S64, the missing pixels in the pixel data of each color are interpolated by means of a method incorporated in the camera, using the data from the surrounding pixels to create R, G and B complete pixel data. After that, the R, G and B complete pixel data is recorded (S66) on a recording medium, after being compressed if necessary (S65). A single color image is obtained by overlapping the complete pixel data. When this image data is input to a personal computer ('PC') 70, the personal computer 70 expands it (S67), whereupon the image data (S68) created by the digital camera 61 is obtained.

Problems Addressed by the Invention

In the digital camera 61 described above, the image data obtained from a single CCD is separated into R, G and B pixel data and missing pixels are interpolated for each color, after which the resulting R, G and B complete pixel data is recorded on a recording medium. Consequently, three times as much data as the actual information obtained from the single CCD is stored on the recording medium (see FIG. 12). Generally, a digital camera that handles image information, which typically includes more data than character information, faces the problem that the capacity of the data recording medium can turn out to be insufficient, and reduction in file sizes is therefore desirable.

In the digital camera 61 described above, image data interpolation for missing pixels is performed using a method incorporated into the camera, but in order for a camera to perform more sophisticated pixel data interpolation, it must have a more complex circuit or a larger program, which essentially entails an increase in cost. Further, where the digital camera 61 is used to display the image, image data interpolation is performed in the camera, and therefore the user cannot perform pixel data interpolation to his liking.

The present invention was created in consideration of these technical issues. Its object is to reduce the load on the recording medium data storage capacity and to provide a digital camera in which the user can perform pixel data interpolation regarding the image data.

SUMMARY OF THE INVENTION

In pursuit of this objective, a digital camera in accordance with the present invention employs an image sensor with color filters that correspond to individual pixels of the sensor. Image data detected by the sensor is recorded, together with data regarding the alignment of the color filters. The image data and the recorded alignment data are transmitted to a device external to the camera, where the image data is interpolated in accordance with the alignment data to produce complete color data for each pixel of the image. The complete color data is used to display the image. By means of this technique, the camera only needs to store and transmit the original image data, rather than interpolated complete image data. In addition, various interpolation processes can be employed in the external device, according to the particular desires of the user.

Embodiments of the present invention will be explained in detail below with reference to the accompanying drawings.

BRIEF DESCRIPTION OF THE DRAWINGS

FIG. 4 is a drawing showing the manner in which the R, G and B pixel data is converted in the digital camera.

FIG. 5 is a drawing showing four types of Bayer type arrays for the R, G and B filters.

FIG. 10 is a drawing showing R, G, and B pixel data that is subject to a second round of pixel interpolation in a personal computer.

DETAILED DESCRIPTION

Figure 1:
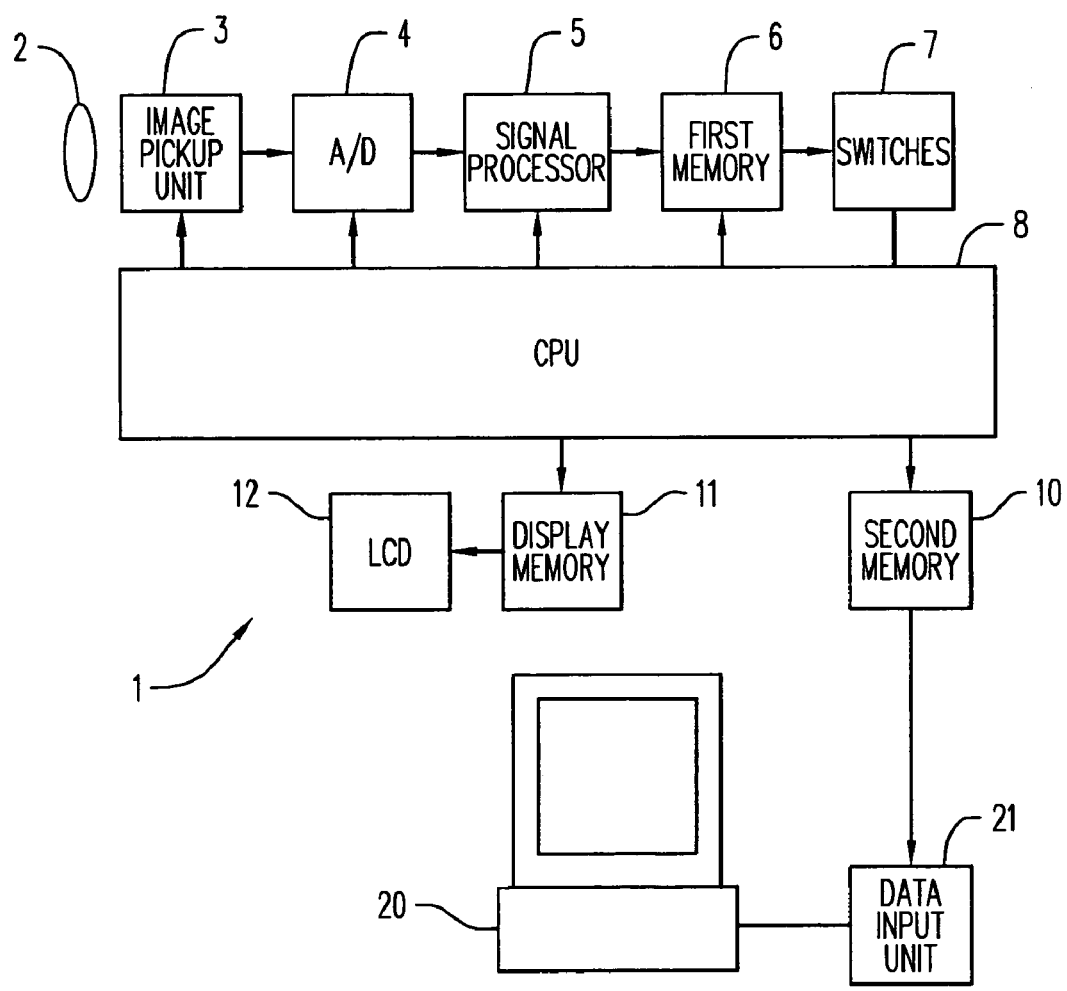
FIG. 1 is a block diagram of a digital camera pertaining to a first embodiment of the present invention.

FIG. 1 is a block diagram of a digital camera 1. This digital camera 1 has an image pickup lens 2, an image pickup unit 3 comprising a CCD equipped with color filters that separate the image signals into data of different colors, an A/D converter 4 that performs A/D conversion of the electrical signals, a signal processor 5 that performs image processing, such as white balance adjustment and gamma correction, of the digital signals obtained by means of the components described above, a first memory 6 that temporarily stores the image data that has undergone signal processing in the signal processor 5, switches 7 including a shutter release switch, a CPU 8 that comprises a microcomputer and that controls the operations of the components and performs processing such as image data compression or expansion or pixel data interpolation, a display memory 11 that stores the image data to be displayed on the LCD display, and an LCD display unit 12 that displays the captured image or recorded image.

This digital camera 1 also has a second memory 10 that records the digital image data produced by the A/D converter 4. In this embodiment, a memory card that is detachable from the camera is used as the second memory 10.

In FIG. 1, a personal computer 20 is shown as the external device to which the image data recorded in the second memory 10 is output. This personal computer 20 has a data input unit 21 to which the second memory 10 is connected and that reads the image data recorded in the second memory 10. The image data thus read is input to the personal computer 20. This personal computer 20 performs expansion of the image data, pixel data interpolation and monitor display based on the programs stored in its memory.

Figure 2:
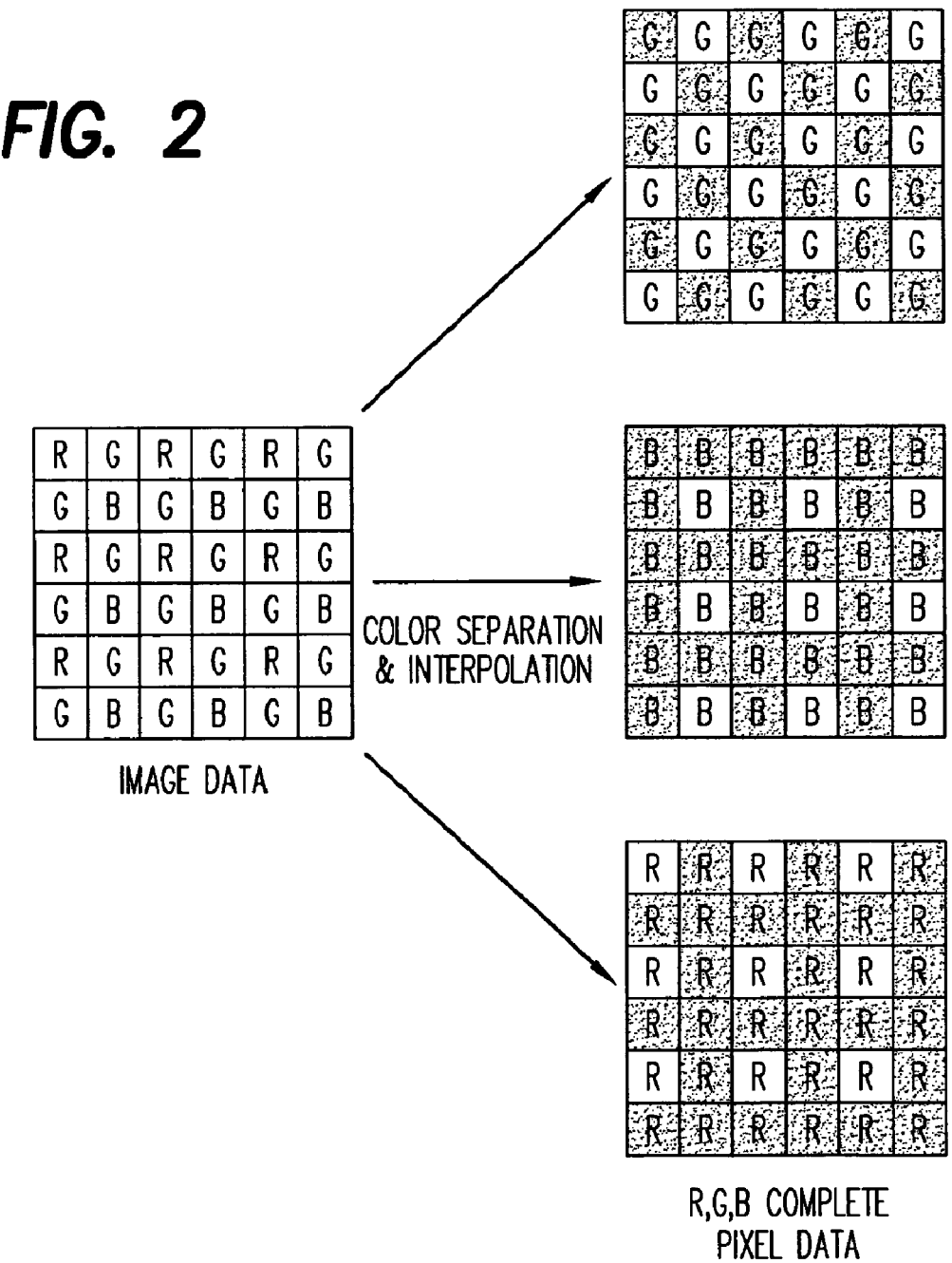
FIG. 2 is a drawing showing R, G and B complete pixel data that is obtained from a single piece of image data.

A CCD whose pixels are each coated with an R, G or B color filter is used. The R, G and B filters in this CCD are aligned such that G occurs in every other pixel in both the vertical arid horizontal directions and R and B are aligned so as to form lines (a so-called Bayer type array). The alignment of the R, G and B filters is stored and processed as filter alignment data in the digital camera 1, which will be explained in detail below.

Where such a CCD is used, when image information is input to the CCD, image data comprising R, G and B pixel data is obtained, as shown in FIG. 2, by means of the R, G and B filters located so as to correspond to individual pixels. In order to construct a color image from this image data, the pixel data is first separated into R, G and B groups.

Pixels that do not have data for a given color (gray areas in FIG. 2, hereinafter 'missing pixels') are interpolated using pixels for which data is properly input (white areas in FIG. 2). In this embodiment, the interpolation is performed by taking an average of the data actually obtained for pixels in a 3×3-pixel area surrounding the missing pixel. Through this interpolation, R, G and B complete pixel data is obtained. By overlapping the R, G and B complete pixel data, one item of image data is obtained.

Figure 3:
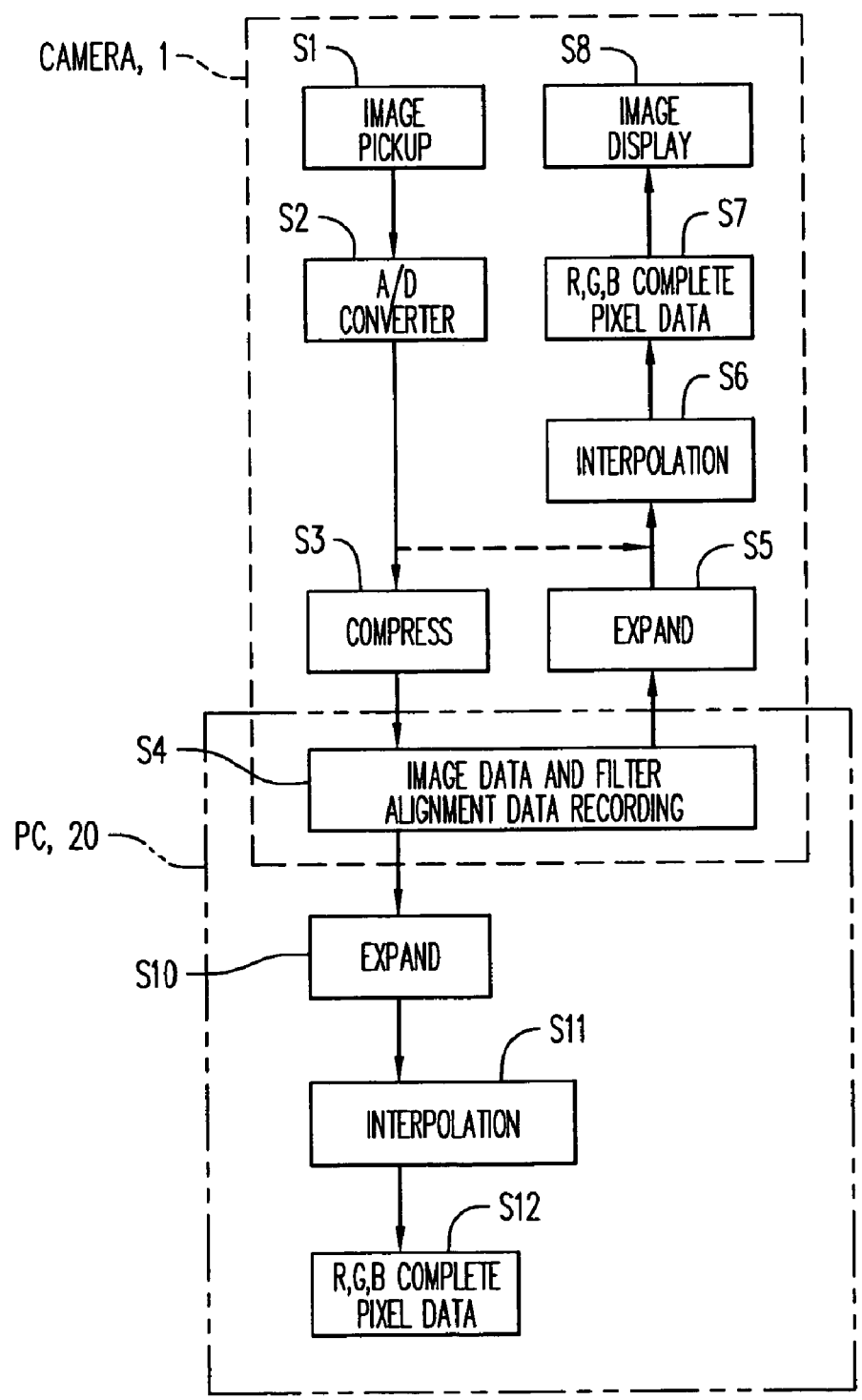
FIG. 3 is a drawing showing the signal processing sequence in the digital camera of FIG. 1.

The signal processing sequence in a digital camera 1 having the construction described above will be explained with reference to FIG. 3. The digital camera 1 first controls the image pickup lens 2 (see FIG. 1) in relation to the photo object, and when an image is formed on the CCD image pickup unit 3, the input image is converted into electrical signals (S1). In step S2, the electrical signals are converted through A/D conversion to form digital image data based on the alignment of the R, G and B filters located so as to correspond to individual CCD pixels. The image data is then compressed if necessary (S3), and is recorded in the second memory 10 in step S4. This digital camera 1 simultaneously records as filter alignment data the alignment of the R, G and B filters that are located so as to correspond to the individual pixels of the CCD image pickup unit 3. This digital camera 1 has a preview function in which the image that entered the image pickup lens 1 is immediately displayed on the built-in LCD display unit 12 when the shutter button is pressed halfway down, for example, and during data processing when this function is present, the image data is digitally converted and is immediately subjected to pixel data interpolation without being compressed, so that the sequence follows the arrow formed by the dashed line in FIG. 3. The compression of image data in step S3 in FIG. 3 will be described in detail below with reference to FIG. 7.

In this embodiment, the captured image or recorded image is output to the built-in LCD display unit 12 of the camera 1 or to a display connected to the personal computer 20. When this is executed, the following additional processing is performed on the digital image data recorded in the second memory 10.

The situation in which the image is output to a display connected to the personal computer 20 will first be explained. In this embodiment, the second memory 10 comprises an IC card, and consequently, the image data and filter alignment data recorded in the second memory 10 are input to the personal computer 20 by inserting this IC card into the data input unit 21 of the personal computer 20. This personal computer 20 has a dedicated reproduction software program that enables it to (1) read the input filter alignment data as well as the image data, (2) separate the image data into data of three different colors based on this filter alignment data, and (3) perform interpolation for missing pixels. Using this program, the personal computer 20 can expand the input image data if necessary (S10 in FIG. 3) and separates the pixel data into R, G and B groups. It then can perform missing pixel interpolation in S11. In this case, the user may select a desired interpolation method from among different interpolation methods incorporated as programs in the computer (the averaging method or the median method, for example). The R, G and B complete pixel data (S12) created through the processing described above is overlaid on itself and output on the display as a single color image.

A case in which the image is output to the built-in LCD display unit 12 of the camera 1 will now be explained. Here, the image data and filter alignment data recorded in the second memory 10 are read, with the IC card comprising the second memory 10 connected to the camera 1. The CPU 8 that controls the camera (see FIG. 1) expands the image data if necessary (S5 in FIG. 3) and separates the pixel data into R, G and B groups. It then performs interpolation for the missing pixels for each color in S6 using an interpolation method incorporated in the camera. The R, G and B complete pixel data (S7) created through this processing is overlaid on itself and output to the LCD display unit 12 (S8) as a single color image.

The built-in LCD display unit 12 of the camera 1 has much fewer pixels than the CCD of the image pickup unit 3, but since the purpose of the image display in the LCD display unit 12 is often confirmation of the image composition and color rather than close-range image viewing, it does not pose any problems for the quality of the displayed image to be slightly lower. Consequently, if a simpler method is used for the pixel data interpolation method incorporated in the camera, the circuit size or program capacity may be reduced.

As can be seen from the explanation given above, in the digital camera 1 of this embodiment, the digital image data obtained through A/D conversion is recorded in the second memory 10 before it is interpolated for missing pixels for each color, i.e., R, G and B. In this second memory 10 is also recorded the alignment of the R, G and B filters that are located so as to correspond to individual CCD pixels, as filter alignment data. Therefore, in this digital camera 1, the image data and filter alignment data are read from the second memory 10 as the image is output, and based on the filter alignment data, the image data is separated into three different colors and pixel data interpolation is performed for each color, whereupon R, G and B complete pixel data is created (see FIG. 4).

By means of this construction, the R, G and B complete pixel data need not be recorded in the recording medium as it is in the example of the prior art, and the amount of data recorded in the second memory 10 may accordingly be reduced.

Furthermore, in this embodiment, where the image data recorded in the second memory 10 is output to the personal computer 20, the user can select an image data interpolation method from among various interpolation methods incorporated in the personal computer 20 as programs. For example, where a more sophisticated interpolation method is programmed into the personal computer 20, the quality of the image output to the display may be improved by selecting this method.

In this embodiment, the Bayer type array described above is used for the alignment of the R, G and B filters located so as to correspond to individual CCD pixels. There are four types of Bayer arrays, as shown in views (a) through (d) of FIG. 5. The 36 pixels at the upper left corner of the CCD are shown for each type of Bayer array. In the digital camera 1, the Bayer array to be used is predetermined to be one of these types (a) through (d), and filter alignment data representing that Bayer array is recorded in the second memory 10 together with the image data.

The present invention is not limited to this approach, however, and it is possible to set the alignment of the R, G and B filters located so as to correspond to individual CCD pixels, such that it may be changed as desired. In this case, alignment data indicating that the filter alignment represents a Bayer type array, as well as the type (a) through (d) that has been adopted, will be recorded as filter alignment data recorded in the second memory 10.

Figure 6A:
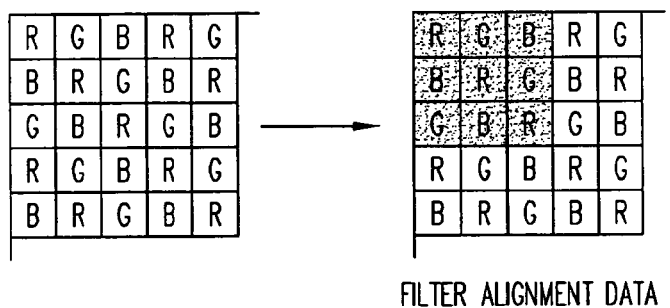
FIG. 6 is a drawing showing special alignments for the R, G and B filters.
Figure 6B:
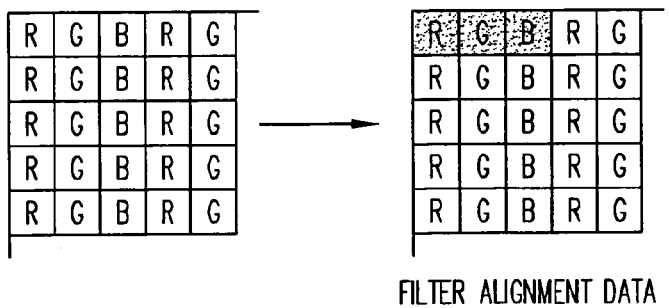

Further, views (a) and (b) of FIG. 6 show special R, G and B filter alignments different from the Bayer type array. In this case, the data indicating the number of pixels in the X direction of the smallest block unit that is repeated from the upper left corner of the CCD and the number of pixels in the Y direction of the same block unit, as well as the pixel color data beginning from the leftmost pixel of the first row, are recorded in the second memory 10. Here, R (red), G, (green), B (blue), C (cyan), M (magenta), and Y (yellow) are set as color data, for example.

Regarding the filter alignment shown in view (a) of FIG. 6, the smallest block unit is 3×3, and the block comprises RGBBRGGBR in that order beginning from the leftmost pixel of the first row. Therefore, the filter alignment data is expressed as X=3, Y=3; 0, 1, 2, 2, 0, 1, 1, 2, 0, where 0 represents red, 1 represents green and 2 represents blue.

Regarding the filter alignment shown in view (b) of FIG. 6, the smallest block unit is 3×1 and the block comprises RGB in that order beginning from the leftmost pixel. Therefore, the filter alignment data is expressed as X=3, Y=1; 0, 1, 2.

The filter alignment data is recorded in the second memory 10 together with the image data in the same way as in the previous embodiment. Using this method, special alignments of R, G and B filters located so as to correspond to individual CCD pixels can be handled.

The compression of the image data (S3 in FIG. 3) will now be explained with reference to FIG. 7. In this embodiment, the widely used discrete cosine transformation (DCT) method is used to perform JPEG compression. By means of this JPEG compression, compression devices and expansion devices currently in wide use can be employed and the cost may be reduced accordingly. In this embodiment, the following processing is performed during JPEG compression.

Figure 7:
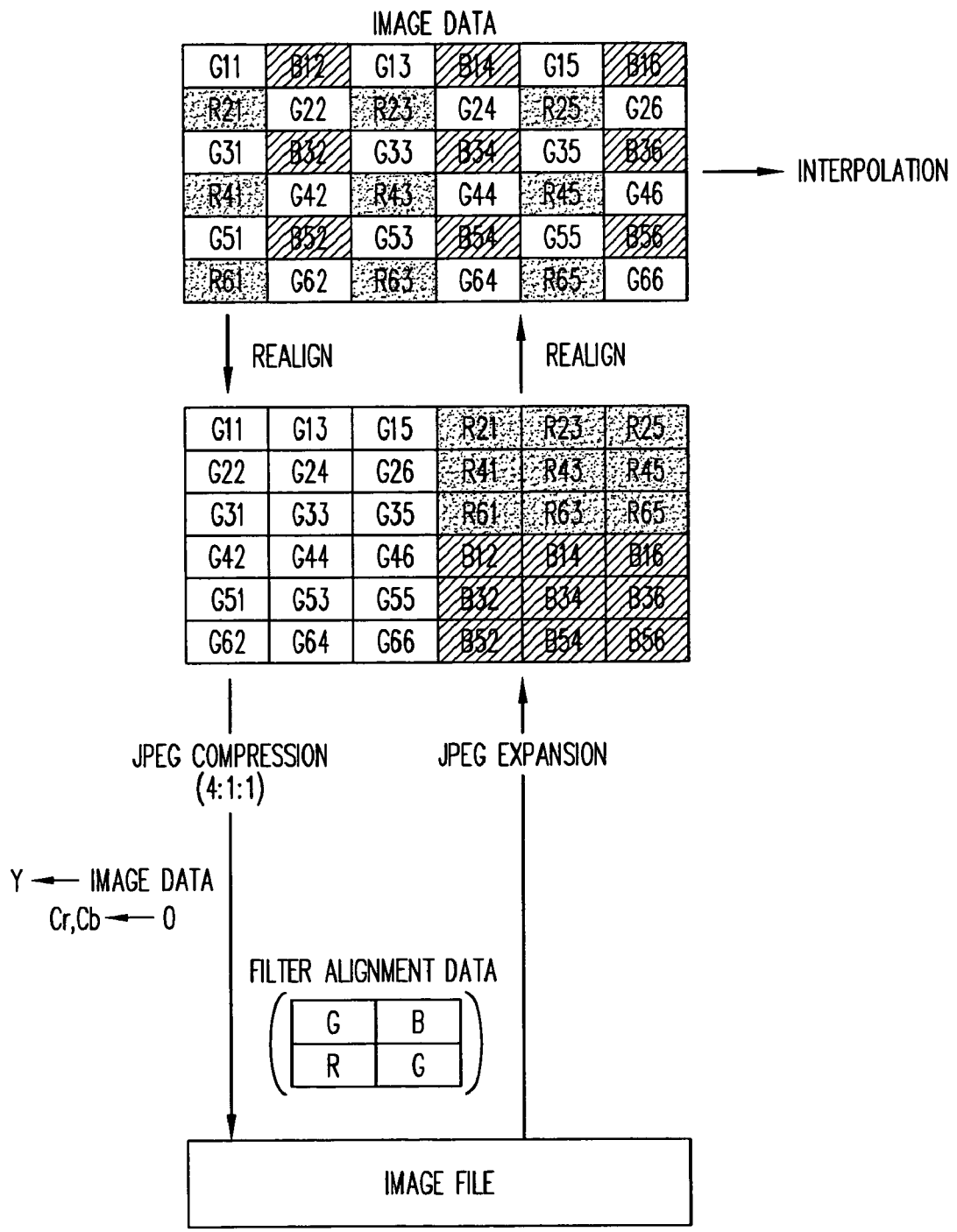
FIG. 7 is a drawing to explain the compression of the image data.

As shown in FIG. 7, R, G and B pixel data is aligned based on the Bayer type array using the image data after A/D conversion. During compression, the R, G, and B pixel data in the image data is realigned such that a block will be formed for each color. G pixels are horizontally displaced to the left such that they will form a block accounting for half the image data, and R and B pixels are collected in the upper right side and lower right side respectively while maintaining their positional relationships in the original image data, such that pixels of each color will form a block accounting for one-quarter of the image data. The method of placement of each color block is determined in advance.

Y data (i.e., brightness data) is deemed to be the image data comprising R, G and B color, all pixels with regard to Cr and Cb data (in other words, color difference data) are deemed '0', and JPEG compression is performed using a high Cr and Cb thinning ratio of 4:1:1. The image data compressed in this way is recorded in the second memory 10 together with the filter alignment data.

By gathering together the R, G and B pixel data during the compression of the image data in this way, the correlations between neighboring pixels may be increased so that the rate of compression may increase. In addition, since the data conversion of R, G, and B into Y, Cr and Cb can be simplified, the required program memory capacity may be reduced. During data expansion, the data is expanded based on the JPEG standard, and the image data can be obtained by realigning the pixel data based on the filter alignment of the original image data.

Figure 8:
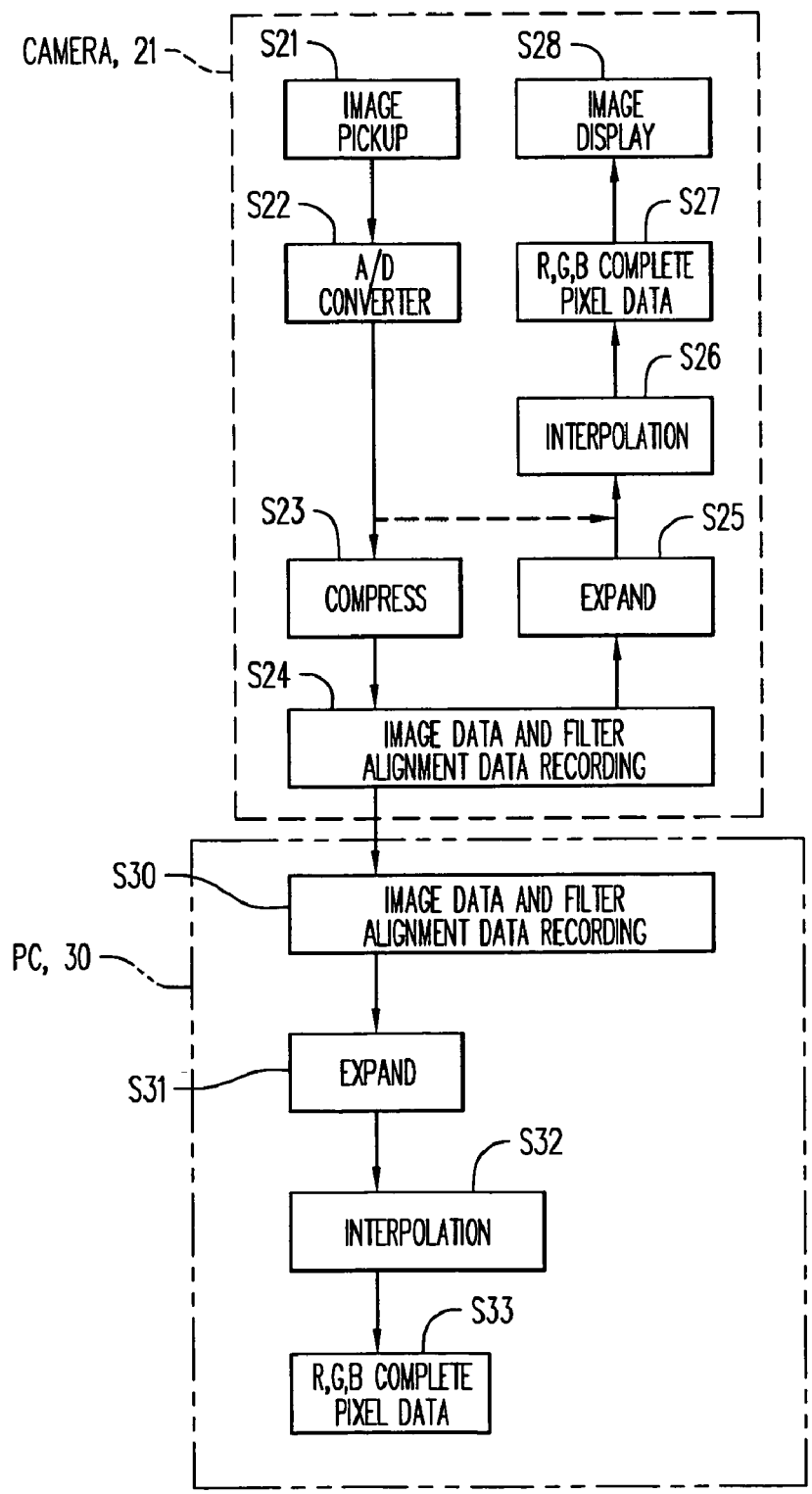
FIG. 8 is a drawing showing the signal processing sequence in a digital camera pertaining to a second embodiment of the present invention.

The signal processing sequence in a digital camera pertaining to the second embodiment of the present invention will now be explained with reference to FIG. 8. In this embodiment, a recording medium that records the image data and filter alignment data is mounted in a camera 21. Therefore, where the image is to be output to an external device such as a personal computer 30, the image data and filter alignment data are output externally either by means of a cable or by infrared communication. Since the data processing in this digital camera 21 (S21 through S28) is the same as the data processing in the digital camera 1 pertaining to the first embodiment described above (S1 through S8 in FIG. 3), it will not be further explained here.

Where the image is to be output to a display connected to the personal computer 30, the image data and filter alignment data recorded in the second memory 10 are input to the personal computer 30 using either a cable or infrared communication in this embodiment, as mentioned above. This personal computer 20 records the input image data and filter alignment data in step S30. While reading the recorded image data and filter alignment data as needed, it separates the image data into three different colors and performs pixel data interpolation for missing pixels (S31 through S33) based on the filter alignment data, as in the case of the first embodiment (S10 through S12 in FIG. 3). The R, G and B complete pixel data created through this processing is overlaid on itself and output on the display as a single color image.

Figure 9:
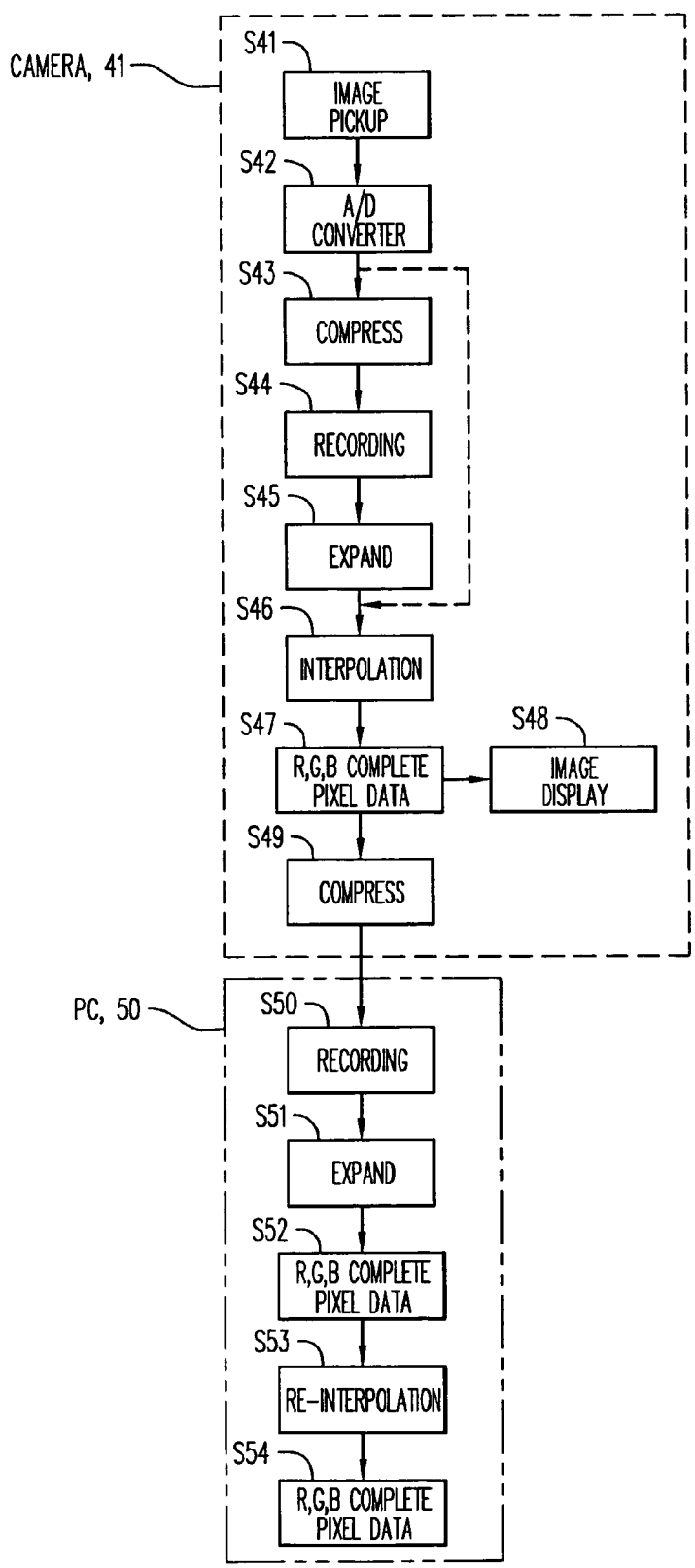
FIG. 9 is a drawing showing the signal processing sequence in a digital camera pertaining to a third embodiment of the present invention.
Figure 11:
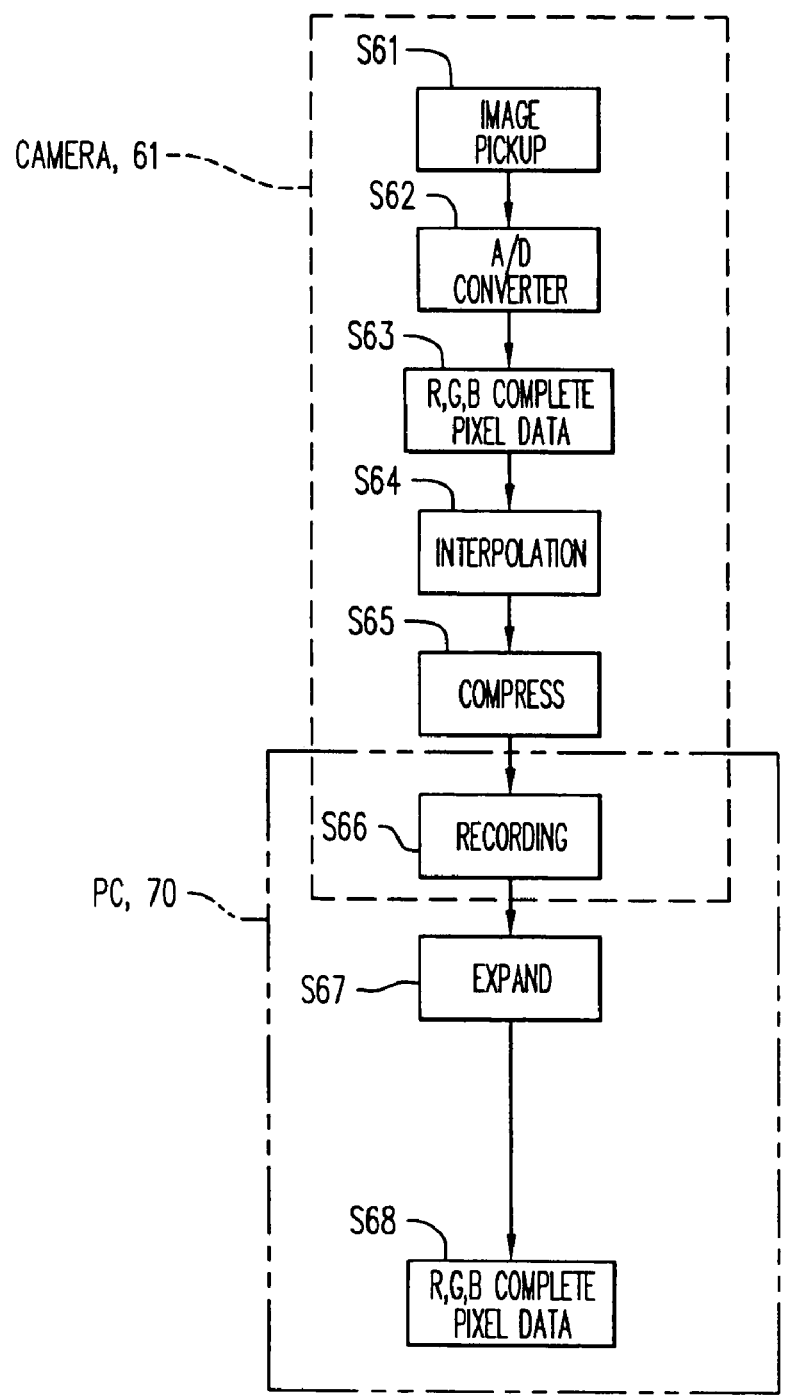
FIG. 11 is a drawing showing the signal processing sequence in a conventional digital camera.
Figure 12:
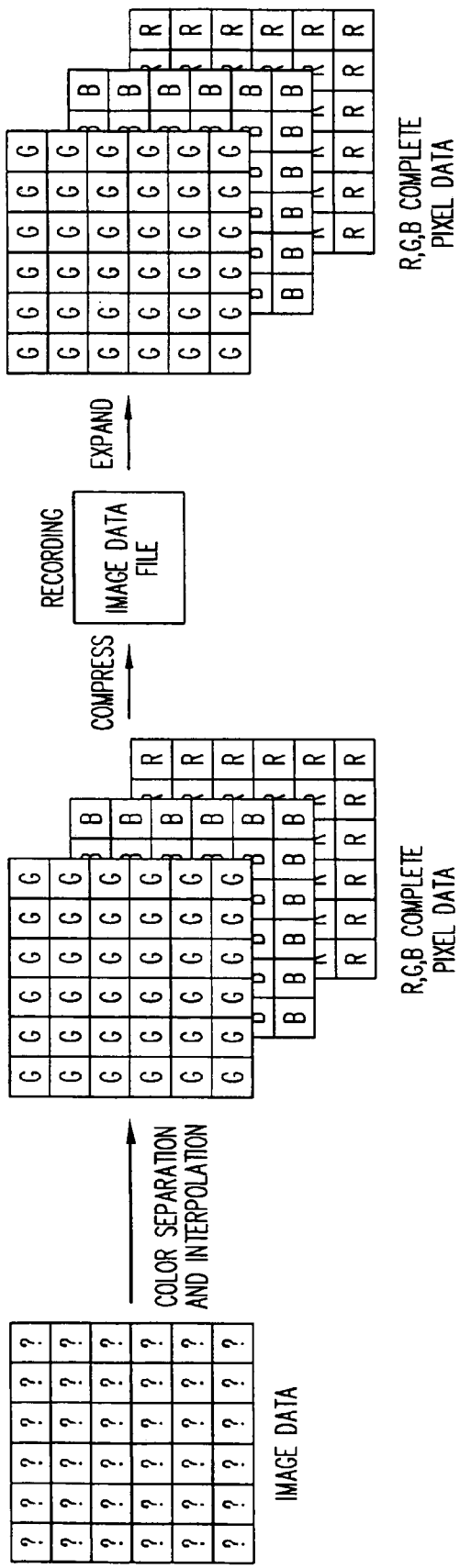
FIG. 12 is a drawing showing the manner in which the R, G and B pixel data is converted in a conventional digital camera.

The signal processing sequence in a digital camera pertaining to a third embodiment of the present invention will be explained below with reference to FIG. 9. In this embodiment, emphasis is placed on compatibility, such that where the image is output externally, prior to being output the digital image data is converted into a format that may be reproduced by another reproduction device. The data processing in a digital camera 41 (S41 through S48) is the same as the data processing in the digital camera 1 pertaining to the first embodiment previously described (S1 through 8 in FIG. 3), and accordingly will not be further explained here.

When the image is output to a personal computer 50, the digital camera 41 separates the digital image data into pixel data of the three different colors based on the filter alignment data, and after performing interpolation for the missing pixels for each color, it compresses the R, G and B complete pixel data obtained through the interpolation (S49). The complete pixel data that comprises the image is input to the personal computer 50 using either a cable or infrared communication. At the same time, the recorded filter alignment data recorded in the recording medium in the digital camera 41 is input as well.

The personal computer 50 records the R, G, and B complete pixel data and filter alignment data in step S50. It then reads the complete pixel data it recorded and expands it (step S51). Through this processing, the R, G and B complete pixel data created in the digital camera 41 is reproduced (S52) and the image may be displayed.

Figure 10:
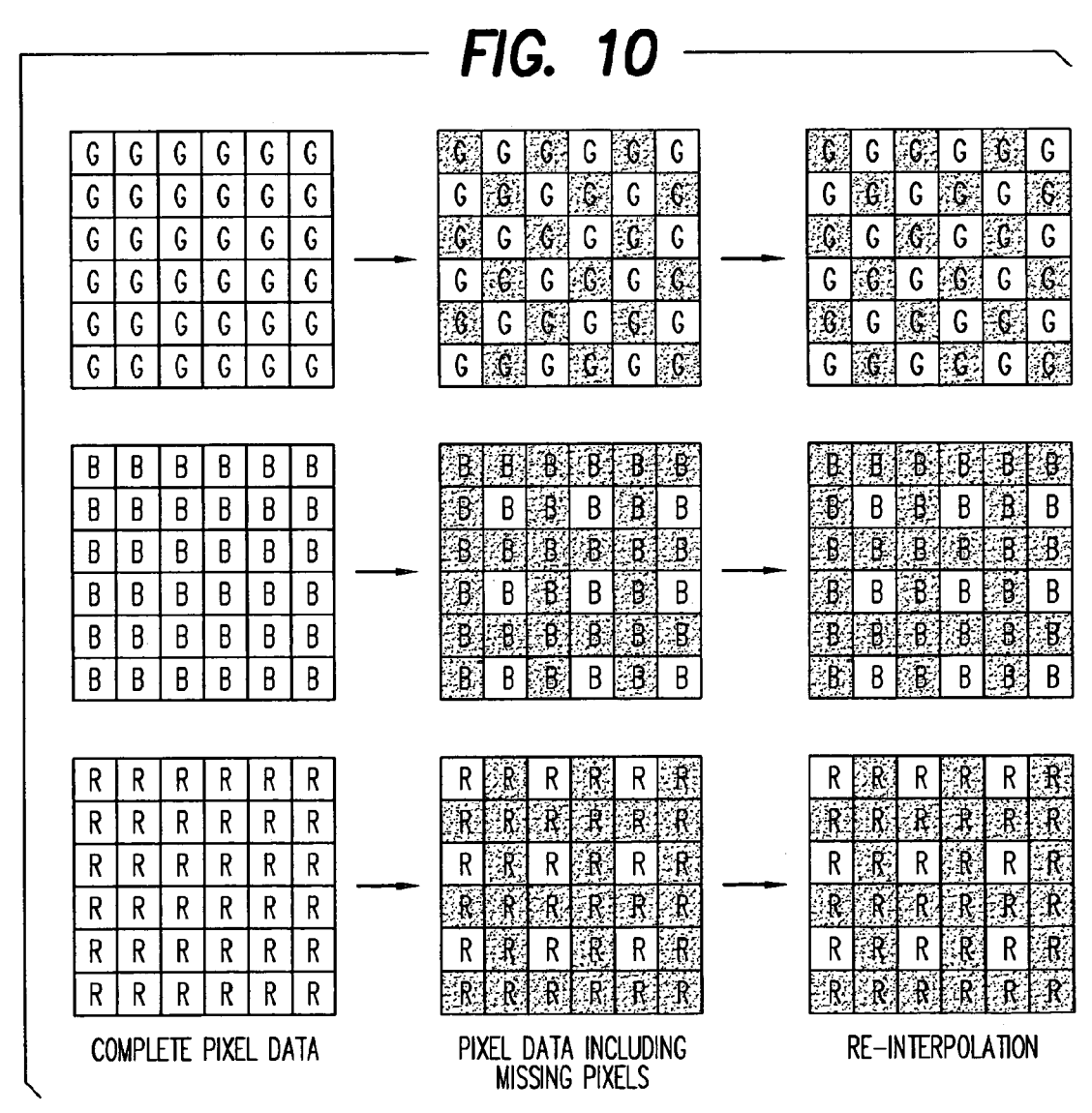

This personal computer 50 has a dedicated software program that enables it to read the filter alignment data input together with the R, G and B complete pixel data and to detect from the complete pixel data, based on the filter alignment data, the image data prior to the performance of interpolation for missing pixels in the digital camera 41. Through this program, the personal computer 50 converts the R, G and B complete pixel data expanded in step S51 into pixel data, including missing pixels, based on the filter alignment data, and can then perform interpolation for these missing pixels once more in step S53 (see FIG. 10). In this case, the user can select a desired interpolation method from among the interpolation methods incorporated in the personal computer 50 as programs. Thus, a simple form of interpolation might be carried out at step S46 in the camera 41, whereas more sophisticated interpolation techniques can be employed at step S53 in the personal computer 50. The R, G and B complete pixel data created through this processing is overlaid on itself and is output on the display as a single color image. In this embodiment, it is preferred that the data compression ratio in step S49 be set as low as possible.

The present invention is not limited to these embodiments explained as examples above, but may, needless to say, be improved or changed in design in various ways within the scope of the essence of the invention.

As can be seen from the explanation provided above, because the digital camera of the present invention has a data control means that separates the digital image data into pixel data of three different colors based on the filter alignment data and interpolates for missing pixels for each color, as well as a display means that reproduces the image comprising complete pixel data of the three different colors obtained by the data control means, the user can confirm the image in the built-in monitor of the camera if necessary.

In addition, since the digital image data after A/D conversion is recorded on a recording medium before pixel interpolation is performed for each color, to obtain R, G and B complete pixel data, the data storage capacity of the recording medium may be reduced. Further, using the present invention, when the image is output to an external device, because the image data is output after it is converted into R, G and B complete pixel data, it can be easily reproduced by an external reproduction device.

Moreover, since the device of the present invention has a display means to reproduce the image comprising complete pixel data of three different colors obtained from the data control means, the user may confirm the image on the built-in display unit of the camera if necessary.

What is claimed is:

1. A digital camera that records a captured image as digital data and that interfaces with an external device, said digital camera comprising:
   an image pickup device equipped with color filters that are located so as to correspond to individual pixels and that perform color separation of the image signals;
   an A/D converter that converts the image signals obtained by said image pickup device into digital image data;
   a recording device that records, together with said digital image data, data regarding the alignment of the color filters located so as to correspond to individual pixels;
   a data processor that, after performing color separation of said digital image data into pixel data of different colors based on said recorded filter alignment data, interpolates for missing pixels for each color using a first process; and
   a display device that reproduces the image comprising complete pixel data of different colors that is obtained from the data processor,
   wherein said external device interpolates for missing pixels for each color using a second process which is different from the first process.

2. A digital camera as claimed in claim 1, wherein said recording device includes a memory card that is detachable from said digital camera.

3. A digital camera as claimed in claim 1, said digital camera having an output unit that outputs the digital image data and filter alignment data to the external device.

4. A digital camera as claimed in claim 1, wherein said data processor controls said digital camera.

5. A digital camera as claimed in claim 1, wherein said recording device simultaneously records said digital image data and said data regarding alignment of the colors filter.

6. A digital camera that records an image as digital image data, said digital camera comprising:
   an image pickup device equipped with color filters that are located so as to correspond to individual pixels and that perform color separation of the image signals;
   an A/D converter that converts the image signals obtained by said image pickup device into digital image data;
   a recording device that records, together with said digital image data, data regarding the alignment of the color filters located so as to correspond to individual pixels;
   a data processor that, after performing color separation of said digital image data into pixel data of different colors based on said recorded filter alignment data, interpolates for missing pixels for each color to produce complete pixel data for each color using a first process; and an output unit that outputs to an external device the complete pixel data of each color obtained from said data processor together with the filter alignment data recorded on said recording device, wherein the external device interpolates for missing pixels for each color using an second process which is different from said first process.

7. A digital camera as claimed in claim 6, said digital camera having a display device that reproduces the image comprising the complete pixel data of each color that is obtained from said data processor.

8. A method for recording and displaying an image, comprising the steps of:

sensing an image with an image sensor having an array of pixels, where each pixel generates data relating to one of a plurality of colors;

simultaneously storing the data generated by the individual pixels of the image sensor and information which describes the colors that are respectively associated with the individual pixels in said array at a first site;

performing a first interpolation of the stored data at said fist site in accordance with said information to produce a first set of complete color data:

transmitting said first set of complete color data from said first site to a second site;

reinterpolating said first set of complete color data at said second site in accordance with said stored information using a different interpolation process to generate a second set of complete color data for the individual pixels; and reproducing the image in accordance with the second set of complete color data.

9. The method of claim 8 wherein each of said pixels in the image sensor generates data relating to one of three colors, and said complete color data comprises a combination of all three colors for any individual pixel.

10. The method of claim 8 further including the step of compressing the image data at said first site prior to transmitting it to said second site.

11. A digital camera that records a captured image as digital data and that interfaces with an external device, said digital camera comprising:

an image pickup device having individual pixels that sense different respective components of an image;

an A/D converter that converts image signals produced by said image pickup device into digital image data;

a recording device that records, together with said digital image data, data regarding the arrangement of said individual pixels of the image pickup device relative to said different components;

a data processor that performs separation of said digital image data into pixel data of different components based on said recorded pixel arrangement data, and interpolates for missing pixels for each component using a first process; and a display device that reproduces the image comprising complete pixel data of different components that is obtained from the data processor;

wherein the external device interpolates for missing pixels for each component using a second process different from the first process.

12. A digital camera as claimed in claim 11, wherein said recording device includes a memory card that is detachable from said digital camera.

13. A digital camera as claimed in claim 11, said digital camera having an output unit that outputs the digital image data and pixel arrangement data to the external device.

14. A digital camera as claimed in claim 11, wherein said data processor controls said digital camera.

15. A digital camera as claimed in claim 11, wherein said recording device simultaneously records said digital image data and said data regarding alignment of the colors filter.

16. A digital camera that records an image as digital image data, said digital camera comprising:

an image pickup device having individual pixels that sense different respective components of an image;

an A/D converter that converts image signals produced by said image pickup device into digital image data;

a recording device that records, together with said digital image data, data regarding the arrangement of said individual pixels of the image pickup device relative to said different components;

a data processor that performs separation of said digital image data into pixel data of different components based on said recorded pixel arrangement data, and interpolates for missing pixels for each components to produce complete pixel data for each component using a first process; and an output unit that outputs to an external device the complete pixel data of each component obtained from said data processor together with the pixel arrangement data recorded on said recording device;

wherein the external device interpolates for missing pixels for each component using a second process different from the first process.

17. A method for recording and displaying an image, comprising the steps of:

sensing an image with an image sensor having an array of pixels, where each pixel generates data relating to one of a plurality of different components of an image;

simultaneously storing the data generated by the individual pixels of the image sensor and information which describes the arrangement of the individual pixels in said array, relative to said different components, at a first site;

performing a first interpolation of the stored data at said first site, in accordance with said information, to produce a first set of complete image data;

transmitting the first complete set of image data from said first site to a second site;

reinterpolating said first set of complete image data at said second site in accordance with said stored information using a different interpolation process to generate a second set of complete image data for each of the individual pixels; and reproducing the image in accordance with the second set of complete image data.

18. The method of claim 17 wherein each of said pixels in the image sensor generates data relating to one of a plurality of colors, and said complete image data comprises a combination of said plurality of colors for each individual pixel.

* * * * *